US009927258B2

(12) United States Patent
Dougherty et al.

(10) Patent No.: US 9,927,258 B2
(45) Date of Patent: Mar. 27, 2018

(54) PSEUDO-ABSOLUTE POSITION SENSING ALGORITHM

(71) Applicant: Eaton Corporation, Cleveland, OH (US)

(72) Inventors: Derek Paul Dougherty, Muskegon, MI (US); John Mendenhall White, Hudsonville, MI (US); Andrew Thompson, Ada, MI (US)

(73) Assignee: EATON CORPORATION, Cleveland, OH (US)

( * ) Notice: Subject to any disclaimer, the term of this patent is extended or adjusted under 35 U.S.C. 154(b) by 343 days.

(21) Appl. No.: 14/428,591

(22) PCT Filed: Mar. 14, 2013

(86) PCT No.: PCT/US2013/031435
§ 371 (c)(1),
(2) Date: Mar. 16, 2015

(87) PCT Pub. No.: WO2014/046728
PCT Pub. Date: Mar. 27, 2014

(65) Prior Publication Data
US 2015/0211892 A1    Jul. 30, 2015

Related U.S. Application Data

(60) Provisional application No. 61/704,057, filed on Sep. 21, 2012.

(51) Int. Cl.
*G01C 17/00*   (2006.01)
*G01D 5/14*   (2006.01)
(Continued)

(52) U.S. Cl.
CPC .............. *G01D 5/14* (2013.01); *F16H 35/16* (2013.01); *G01D 5/04* (2013.01); *Y10T 74/19* (2015.01)

(58) Field of Classification Search
USPC ................... 708/201; 702/150, 151
See application file for complete search history.

(56) References Cited

U.S. PATENT DOCUMENTS

| | | | |
|---|---|---|---|
| 4,183,014 A | 1/1980 | McClean et al. | |
| 5,457,371 A | 10/1995 | Gordon | |

(Continued)

FOREIGN PATENT DOCUMENTS

| | | | |
|---|---|---|---|
| DE | 10 2011 106 339 A1 | 9/2012 | |
| JP | 62100028 A | 5/1987 | |

(Continued)

OTHER PUBLICATIONS

European Patent Office; International Search Report and Written Opinion issued in corresponding International Application No. PCT/US2013/031435, dated Jun. 7, 2013.

*Primary Examiner* — Lam Nguyen
(74) *Attorney, Agent, or Firm* — Fishman Stewart PLLC

(57) ABSTRACT

A system having a position sensing algorithm for determining a position of an electro-mechanical actuator (EMA) stroke includes a first rotary component supported for rotation about a first axis, and a second rotary component supported for rotation about a second axis. A first rotary encoder may be configured to generate an output based on an angular position of the first rotary component, and a second rotary encoder may be configured to generate an output based on an angular position of the second rotary component. The first and second rotary components may define a ratio such that the first and second rotary encoders generate unique combinations of outputs for an entire stroke of an EMA. A decoder may be provided having a position sensing algorithm that determines a position of the EMA stroke based on the ratio between first and second rotary components and outputs from first and second encoders.

18 Claims, 1 Drawing Sheet

(51) Int. Cl.
*G01D 5/04* (2006.01)
*F16H 35/16* (2006.01)

(56) References Cited

U.S. PATENT DOCUMENTS

| | | |
|---|---|---|
| 6,519,549 B1 * | 2/2003 | Lin ........................ B62D 15/02 702/150 |
| 6,615,156 B2 | 9/2003 | Elliott et al. |
| 6,772,087 B2 | 8/2004 | Sasaki |
| 7,259,551 B2 | 8/2007 | Mock et al. |
| 7,584,551 B2 | 9/2009 | Suzuki et al. |
| 2014/0005976 A1 | 1/2014 | Platzer et al. |

FOREIGN PATENT DOCUMENTS

| | | |
|---|---|---|
| JP | 8271286 A | 10/1996 |
| WO | 2012/110055 A1 | 8/2012 |

\* cited by examiner

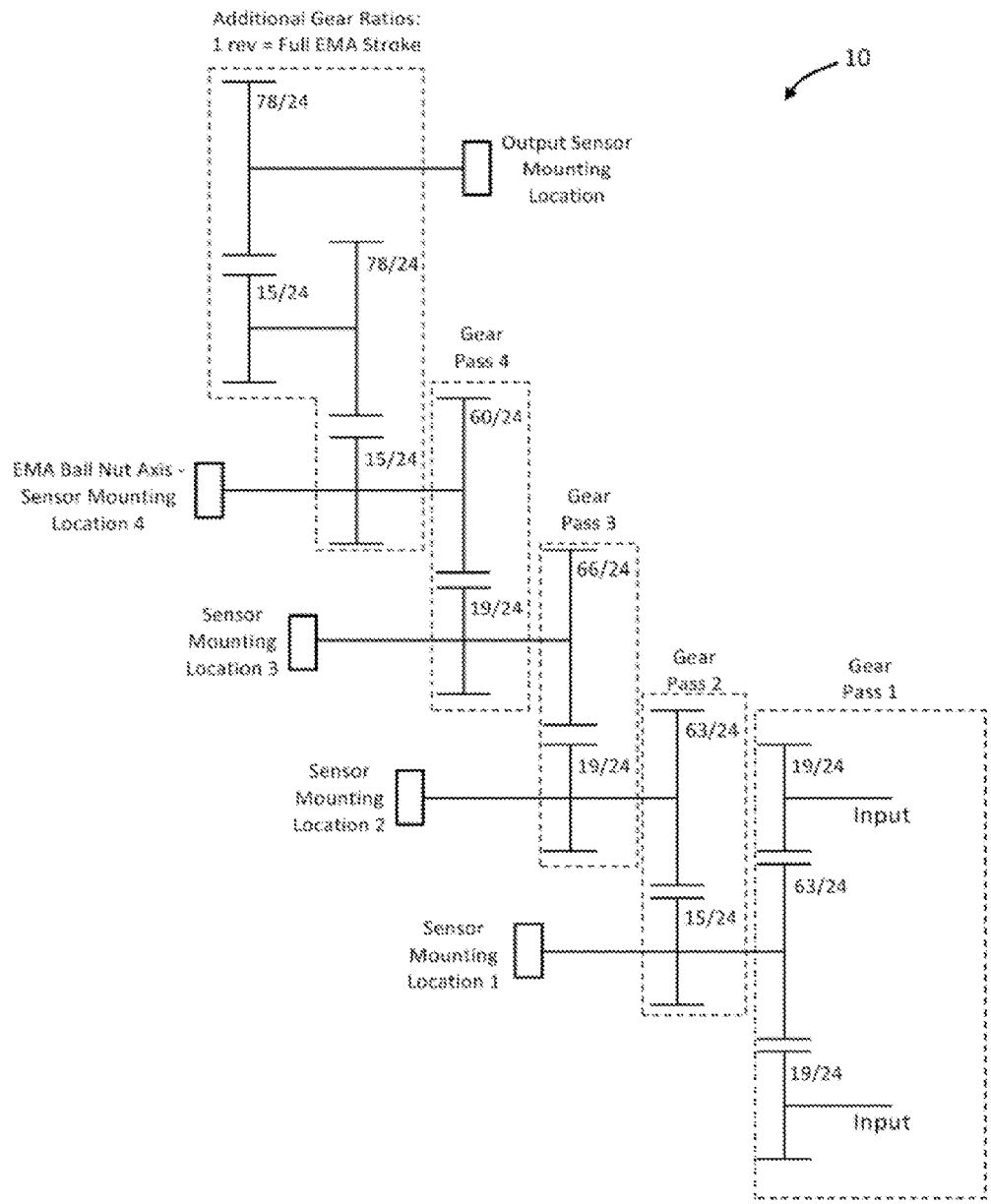

PSEUDO-ABSOLUTE POSITION SENSING ALGORITHM

CROSS-REFERENCE TO RELATED APPLICATIONS

This application is a national stage filing based upon International Application No. PCT/US2013/031435, with an international filing date of Mar. 14, 2013, which claims the benefit of U.S. Provisional Application Ser. No. 61/704,057, filed Sep. 21, 2012, the disclosures of which are incorporated herein by reference in their entirety.

TECHNICAL FIELD

The present disclosure relates to position sensing algorithms, including a position sensing algorithm that uses rotary position sensors to calculate a positional output of a mechanical system.

BACKGROUND

It is known to measure the angular displacement of a shaft using a rotary variable differential transformer (RVDT). In general, an RVDT is an electrical transformer that includes a rotor supported for rotation within a housed stator assembly. The RVDT provides an output voltage that is linearly proportional to the angular displacement of the shaft. However, when used to determine the absolute position of an electro-mechanical actuator (EMA), a RVDT system typically uses an anti-backlash gear train related to an output axis of the EMA to determine the absolute position. An RVDT system may also require drive electronics for excitation and position decoding. Further, an RVDT system can be relatively complex, heavy, and costly.

SUMMARY

An embodiment of a system has a position sensing algorithm that employs rotary position sensors to determine the position of an electro-mechanical actuator (EMA) stroke. The system may include a first rotary component supported for rotation about a first axis and a second rotary component supported for rotation about a second axis. A first rotary encoder may be configured to generate an output based on an angular position of the first rotary component and a second rotary encoder may be configured to generate an output based on an angular position of the second rotary component. The first and second rotary components may define a ratio such that the first and second rotary encoders generate unique combinations of outputs for an entire stroke of said EMA. A decoder may be provided that includes a position sensing algorithm for determining a position of an EMA stroke based on a ratio between first and second rotary components and outputs from first and second encoders.

Various aspects of the present disclosure will become apparent to those skilled in the art from the following detailed description of the embodiments, when read in light of the accompanying drawings.

DESCRIPTION OF THE DRAWINGS

Embodiments of the invention will now be described, by way of example, with reference to the accompanying drawing, wherein:

FIG. 1 is a diagram of an electro-mechanical actuator (EMA) having a gear train in accordance with an embodiment of the present disclosure.

DETAILED DESCRIPTION

A pseudo-absolute position sensing algorithm according to one aspect of the teachings use two rotary position sensors to calculate a positional output of a mechanical system using a mechanical ratio between two or more axes of rotation. In one example, the algorithm uses the gear ratio relationship to calculate the position of a final output stage of an electromechanical system, which can be any system that uses a gear train to translate a rotary input into a mechanical output (e.g., a linear output, a rotary output, etc.). Once the system has been calibrated and as long as the mechanical relationship of the sensors is held constant, the algorithm can calculate the current position.

FIG. 1 illustrates one possible electro-mechanical actuator (EMA) system, indicated generally at 10. The EMA system 10 may have a gear train with at least a first gear, a first absolute rotary encoder that senses the angular position of the first gear, a second gear, and a second absolute rotary encoder that senses the angular position of the second gear. The EMA gear train 10 shown in the drawings is for illustrative purposes only; those of ordinary skill in the art will recognize that the sensing algorithm described herein can be used in any system having a gear train, and more broadly having a gear ratio, without departing from the scope of the teachings.

The first and second encoders can be disposed anywhere in the EMA system 10. In one example, the first encoder may be mounted on a motor pinion in the EMA system 10 and the second encoder may be mounted near an output stage of the EMA system 10. The inputs of the first and second encoders depends on the angular positions of the first and second gears, respectively, relative to their rotational axes. The first and second encoders generate first and second outputs corresponding to the positions of the first and second gears and send the outputs to a decoder. Note that in practice, the first and second gears rarely have a zero index or timing mark and it is very improbable that encoders be perfectly aligned with each other or the gear train and thus there be likely be some initial error. Thus, the algorithm may generate an offset value to zero out the positions of the encoders at an initial starting position as an calibration step and store this offset value in the EMA system 10. Afterward, as long as the encoders do not change position relative to the first and second gears the algorithm can determine the absolute position of the EMA output.

To determine the absolute angular position of a stroke in the EMA gear system 10, the first and second outputs from the rotary encoders create unique combinations for an entire stroke of the EMA system 10. Based on the mathematical relationships between the angular positions of the two encoders and the gear ratio between the first and second gears the decoder generates an output representing the stroke position of the EMA system 10. The unique combinations from the rotary encoders ensure that the decoder will not generate an erroneous position output.

Generating unique encoder output combinations depends on the mechanical characteristics of the first and second gears. As is known in the art, for a given gear ratio, the smaller gear will change its angular position by an incremental amount for each full rotation of the larger gear. In one aspect of the teachings, generating unique combinations of angular positions and outputs involves ensuring that the first and second gears have a non-integer gear ratio with a relatively prime decimation. More particularly, there should be enough decimation in the gear ratio to sustain all the required gear rotations without repeating angular position combinations for a given gear ratio at any time during a stroke of the EMA system 10. The gear ratio may be a rational number represented as m/n, where both m and n are relatively prime numbers. For example, for a gear ratio of 157:1, the gear shaft would rotate 157 times before the angular position combination would repeat. This would be acceptable if fewer than 157 total gear shaft revolutions were needed to complete a full EMA stroke. However, if more gear shaft revolutions are needed in the stroke of the EMA system 10, the gear ratio could be changed to accommodate this. For example, a gear ratio of 157.2:1 would repeat after 786 rotations (because 1572 is divisible by 2). However, a gear ratio of 157.1:1 would require 1571 rotations of the gear shaft before the angular position combination repeats.

The algorithm will now be described via two theories: angular theory and digital theory. In the angular theory, the algorithm maintains the following relationships through an entire EMA stroke:

$$\theta\_1 = mod(x\_1, 1)360$$

$$\theta\_2 = mod(x\_2, 1)360$$

$$\theta\_3 = mod\left(\frac{x\_1}{Gear\_Ratio}, 1\right)360$$

$$\theta\_4 = mod\left(\frac{x\_2}{Gear\_Ratio}, 1\right)360$$

Where x is the number of gear train revolutions $$\theta\_1 \neq \theta\_4$$

$$\theta\_3 \neq \theta\_4$$

For any x_1 and x_2.

As can be seen in the equations above, the functions are continuous and the unique combinations can be created for a given gear train provided the relationships above are satisfied. At any point during the EMA stroke, the gear axis on which the first and second encoders are mounted generates unique angular position combinations relative to the axis.

When the algorithm is used in a digital system, the resolution of the first and second encoders is limited by the bit resolution of the encoder output (i.e., the analog-to-digital conversion of the output). Thus, implementation of the algorithm in the digital realm needs to take into account the bit resolution and accuracy to generate the unique angular position combinations. The relationship described above with respect to the angular theory, when transferred to the binary realm, may be described as follows:

$$y_1 = mod(x_1 n1, n1)$$

$$y_2 = mod(x_2 n1, n1)$$

$$y_3 = mod\left(\frac{x_1 n2}{Gear\_Ratio}, n2\right)$$

$$y_4 = mod\left(\frac{x_2 n2}{Gear\_Ratio}, n2\right)$$

Where $x_n$ is the number of revolutions of sensor 1, and n1 and n2 are the counts for the individual sensors $n=2^{bits}$.

$$y_1 \neq y_2$$

$$y_3 \neq y_4$$

For any $x_1$ and $x_2$.

In this example, at any point throughout the EMA stroke, the first and second encoders generate unique binary values corresponding to the unique angular positions. The resolution of the first and second encoders is then limited to the angular degrees per count of the encoder outputs (360 degrees/n).

Note that the position information from the first and second encoders may include a large amount of data, making it difficult to store in a digital memory having limited storage space. To overcome this issue, the algorithm may translate the outputs of the first and second encoders into a linear relationship using the gear ratio and the incremental change in the angular position of the smaller gear for each full rotation of the larger gear. Based on this incremental position change, the input of the encoder with the lowest number of axis revolutions is added to a scaled multiplicand of the original encoder position based off the current axis's angular position. Thus, the outputs of the first and second encoders can be linearly translated as follows:

| | |
|---|---|
| $n1 = 2^{b1}$ | Total number of counts for sensor 1 |
| $n2 = 2^{b2}$ | Total number of counts for sensor 2 |
| $gr = \left(\frac{m\_gr_1}{n\_gr_2}\right)\left(\frac{m\_gr_2}{n\_gr_2}\right)\left(\frac{m\_gr_n}{m\_g_n}\right)$ | Total gear ratio |
| $r2 = 25$ | Number of sensor 2 revolutions specified by EMA design |
| $r1 = r2gr$ | Number of sensor 1 revolutions |
| $k$ | Uncertainty factor |
| $y1(x) = floor\,(mod\,(\lvert x \rvert\, n1, n1))$ | Sensor 1 output |
| $y2(x) = floor\left(mod\left(\frac{\lvert x \rvert}{gr} n2, n2\right)\right)$ | Sensor 2 output | where b1=number of bits for the first encoder b2=number of bits for the second encoder m_gr$_n$=numerator of the gear ratio n_gr$_n$=denominator of the gear ratio r1=number of rotations in the first encoder required to complete an entire EMA stroke
r2=number of rotations in the second encoder required to complete an entre EMA stroke
k=uncertainty factor
floor=rounding down to the nearest integer
mod=computing the modulo, where mod(x,y) computes the remainder of dividing x by y (x modulo y)

The algorithm may also include the following validity check for the relationships to be valid:

$$n1 > k \cdot r2$$
$$n2 > k \cdot r1$$
$$1 > n1 - y1(gr)\frac{n1}{r2}$$

The output of the second encoder may be scaled to match the output of the first encoder as follows:

$$y1\_prime(x) = mod\left(floor\left(y2(x)gr\frac{n1}{n2}\right), n1\right)$$

$$nraw(x) = \begin{cases} y1\_prime(x) - y1(x) - (n1-1) \text{ if } y1\_prime(x) - y1(x) - n1 - 1 \\ y1\_prime(x) - y1(x) \text{ otherwise} \end{cases}$$

The relationship above establishes the difference between scaled output of the second encoder and the output of the first encoder. The relationship is made to keep the range less than n1−1 counts to accommodate the limited data storage in the system.

To shape the difference between the first and second encoder outputs into a stepwise function based off of nraw, the following relationship may be applied:

$$nraw2(x) = \begin{cases} nraw(x) - n1 \text{ if } nraw(x)n1 - 1 \\ nraw(x) - n1 \text{ if } nraw(x)\_ - 2 \\ nraw(x) \text{ otherwise} \end{cases}$$

This relationship limits the range of nraw2 to within −2 (an arbitrary number allowed below zero deviation) to 127.

The count difference during a gear rotation may be described as:

$$w(x) = n1 - mod(xn1, n1)$$

and a stepwise function (with a tolerance of w(g)/2) based off the gear ratio may be described as:

$$m(x) = floor\left(\frac{nraw2(x) - \frac{w(gr)}{2}}{w(gr)}\right)$$

The linear function y based off the position outputs of the first and second encoders can be described as:

$$y(x) = y2(x) + m(x)n$$

The above algorithm may also include an additional gear train constraint:

$$1 < n1 - y1(gr) < \frac{n1}{r2}$$

Where y1(gr) is an encoder output when the numerical value of the gear ratio revolutions has occurred. This constraint ensures that for each revolution of, for example, the first encoder, the output of the second encoder changes by at least one count, but less than the number of first encoder counts per scaled revolutions of the second encoder.

The system above therefore provides accurate position sensing via low-cost rotary encoder sensors instead of higher-cost devices, such as rotary or linear variable differential transformers. The encoders reduce system setup times and support because they can be electronically calibrated instead of manually calibrated, and they also use a much simpler electronic configuration than existing systems. The system also allows position sensing of any mechanically-constrained input, such as an electric motor. Using the gear train characteristics in the sensor algorithm has the added advantage of being able to detect problems in the gear train itself (e.g., free play or backlash).

Although the above example focuses on an actuator system with a gear train, the algorithm can be used in any system that contains a mechanical advantage using two or more rotational axes for determining a total number of axial rotations of an output stage (which does not have to be the final output of the system) based on the relationships of the mechanical ratios. In other words, the algorithm can be used in any system that translates a rotary output to a mechanical output. Once the system is calibrated, it can sense the absolute position of the final output as long as the mechanical relationship of the axes, and therefore the encoders, is held constant.

It will be appreciated that the above teachings are merely exemplary in nature and is not intended to limit the present teachings, their application or uses. While specific examples have been described in the specification and illustrated in the drawings, it will be understood by those of ordinary skill in the art that various changes may be made and equivalents may be substituted for elements thereof without departing from the scope of the present teachings as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present teachings not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:
1. A system with an output stage and rotational component, comprising:
    a first rotary component and a second rotary component;
    a first rotary encoder configured to generate a first output based on an angular position of the first rotary component;

a second rotary encoder configured to generate a second output based on an angular position of the second rotary component; and a decoder including a position sensing algorithm configured to determine a position of a final output stage using the first and second outputs, wherein a ratio between the first and the second rotary components is a non-integer ratio with a relatively prime decimation, the angular position of the second rotary components changes an incremental amount for each full rotation of the first rotary component, combinations of the first and second outputs are unique during a select number of rotations of said rotational component of said output stage; and the ratio satisfies the equation:

$$1 > n1 - y1(gr)\frac{n1}{r2}$$

where y1(gr) is a sensor output when the numerical value of the ratio revolutions has occurred, n1 is a number of bits for the first encoder, and r2 is a number of bits for the second encoder.

2. The system of claim 1, wherein the ratio is m/n, and m and n are co-prime.

3. The system of claim 2, wherein the first and second rotary components comprise gears, and the number of teeth on the first rotary component is greater than a number of rotations of that components for an entire mechanical stroke.

4. The system of claim 1, wherein the first rotary component comprises a motor pinion and the second rotary component comprises an output gear in an electro-mechanical actuator.

5. The system of claim 1, wherein the first rotary component is provided in a third gear pass and the second rotary component is provided in a fourth gear pass in an electro-mechanical actuator.

6. The system of claim 5, wherein the third gear pass has a gear ratio of 66/19 and the fourth gear pass has a gear ratio of 60/19.

7. The system of claim 1, wherein the first rotary component is provided in a second gear pass and the second rotary component is provided in a fourth gear pass in an electro-mechanical actuator.

8. The system of claim 7, wherein the second gear pass has a gear ratio of 63/15 and the fourth gear pass has a gear ratio of 60/19.

9. A system for determining the position of an electro-mechanical actuator (EMA) stroke, the system comprising:

a first rotary component supported for rotation about a first axis and a second rotary component supported for rotation about a second axis;

a first rotary encoder configured to generate an output based on an angular position of the first rotary component and a second rotary encoder configured to generate an output based on an angular position of the second rotary component, wherein the first and second rotary components define a ratio such that the first and second rotary encoders generate unique combinations of outputs for an entire stroke of said EMA; and a decoder having a position sensing algorithm configured to determine a position of said EMA stroke based on the ratio between the first and second rotary components and the outputs from the first and second encoders;

wherein the ratio satisfies the equation:

$$1 > n1 - y1(gr)\frac{n1}{r2}$$

where y1(gr) is a sensor output when the numerical value of the ratio revolutions has occurred, n1 is a number of bits for the first encoder, and r2 is a number of bits for the second encoder.

10. The system of claim 9, wherein the ratio between the first and the second rotary components is a non-integer ratio with a relatively prime decimation.

11. The system of claim 9, wherein the angular position of the second rotary component changes an incremental amount for each full rotation of the first rotary component.

12. The system of claim 9, wherein the ratio is m/n, and m and n are co-prime.

13. The system of claim 12, wherein the first and second rotary components are gears, and the number of teeth on the first rotary component is greater than a number of rotations of that components for an entire mechanical stroke of said EMA.

14. The system of claim 9, wherein the first rotary component is a motor pinion and the second rotary component is an output gear of the EMA.

15. The system of claim 9, wherein the first rotary component is provided in a third gear pass and the second rotary component is provided in a fourth gear pass of said EMA.

16. The system of claim 15, wherein the third gear pass has a gear ratio of 66/19 and the fourth gear pass has a gear ratio of 60/19.

17. The system of claim 9, wherein the first rotary component is provided in a second gear pass and the second rotary component is provided in a fourth gear pass of said EMA.

18. The system of claim 17, wherein the second gear pass has a gear ratio of 63/15 and the fourth gear pass has a gear ratio of 60/19.

* * * * *